(12) United States Patent
Ohashi et al.

(10) Patent No.: US 6,810,100 B2
(45) Date of Patent: Oct. 26, 2004

(54) METHOD FOR TREATING POWER PLANT HEATER DRAIN WATER

(75) Inventors: Shinichi Ohashi, Tokyo (JP); Toshio Morita, Tokyo (JP)

(73) Assignee: Organo Corporation, Tokyo (JP)

(*) Notice: Subject to any disclaimer, the term of this patent is extended or adjusted under 35 U.S.C. 154(b) by 53 days.

(21) Appl. No.: 10/292,168

(22) Filed: Nov. 12, 2002

(65) Prior Publication Data

US 2003/0128797 A1 Jul. 10, 2003

(30) Foreign Application Priority Data

Nov. 22, 2001 (JP) .................................... 2001-358434

(51) Int. Cl.[7] .............................................. G21C 19/30
(52) U.S. Cl. ...................... 376/306; 376/304; 376/305; 60/783; 60/644.1; 60/39.3; 60/39.29; 210/639; 210/636
(58) Field of Search ................................ 376/305, 306, 376/300, 277, 310, 313, 361, 370, 377, 366; 60/39.3, 39.29, 644.1, 783; 210/636, 639; 122/412, 431, 459, 466

(56) References Cited

U.S. PATENT DOCUMENTS

| | | | | |
|---|---|---|---|---|
| 4,564,499 A | * | 1/1986 | Honda et al. | ............... 376/305 |
| 4,820,473 A | * | 4/1989 | Ohashi et al. | ............... 376/305 |
| 4,927,598 A | * | 5/1990 | Nishino et al. | ............. 376/306 |
| 5,339,621 A | * | 8/1994 | Tolman | ........................ 60/783 |
| 5,398,269 A | * | 3/1995 | Nagase et al. | .............. 376/306 |
| 5,467,375 A | * | 11/1995 | Sasaki | ......................... 376/300 |
| 5,892,805 A | * | 4/1999 | Yamane et al. | .............. 376/306 |

FOREIGN PATENT DOCUMENTS

| | | | |
|---|---|---|---|
| JP | 4-110023 | * | 4/1992 |
| JP | 11-57416 | * | 3/1999 |

OTHER PUBLICATIONS

English Patent Abstract for 4–110023 from esp@cenet, published May 11, 1993.

English Patent Abstract for 11–057416 from esp@cenet, published Mar. 2, 1999.

\* cited by examiner

*Primary Examiner*—Michael J. Carone
*Assistant Examiner*—John Richardson
(74) *Attorney, Agent, or Firm*—Osha & May L.L.P.

(57) ABSTRACT

Oxygen is mixed with heater drain water of power plant which contains fine particles of iron oxides such that the concentration of the dissolved oxygen in the heater drain water after the mixing of oxygen is in a range from 1 μg/liter to 20 μg/liter. The obtained heater drain water after oxygen mixing is filtered through a filter such as a hollow fiber filter to remove fine particles of iron oxides.

6 Claims, 5 Drawing Sheets

RELATIONSHIPS BETWEEN TIME OF WATER PASSING AND IRON REMOVAL RATES
WHEN SMALL AMOUNT OF OXYGEN IS INJECTED AND WHEN NO OXYGEN IS INJECTED

RELATIONSHIPS BETWEEN TIME OF WATER PASSING AND IRON REMOVAL RATES WHEN SMALL AMOUNT OF OXYGEN IS INJECTED AND WHEN NO OXYGEN IS INJECTED

Fig. 5

METHOD FOR TREATING POWER PLANT HEATER DRAIN WATER

BACKGROUND OF THE INVENTION

1. Field of the Invention

The present invention relates to a method for treating heater drain water in a power plant.

2. Description of the Related Art

Typically, fine particles of iron oxides are present in heater drain water generated at pressurized water reactor nuclear power plants (hereinafter abbreviated simply as "PWR"), in boiling water reactor nuclear power plants (hereinafter abbreviated simply as "BWR"), or in fossil-fueled power plants. These fine particles of iron oxides must be removed.

For example, in a PWR, impurities such as metal oxides mainly consisting of fine particles of iron oxides are introduced along with the feed water to devices on the secondary side of a steam generator (hereinafter abbreviated simply as "SG") which produces steam for driving a turbine. While power is generated, these impurities gradually adheres to the outer surfaces of heat transfer pipes or a clevis section of the SG, causing reduction in heat transfer efficiency and corrosion of the heat transfer pipes. Because of this, conventionally, various methods have been attempted for reducing the concentration of impurities within the feed water which are transferred to the secondary side of SG.

Similar to the case of a PWR as described above, in a thermal power plant, impurities such as described above contained in the feed water to a boiler gradually adheres onto the outer surfaces of heat transfer pipes of the boiler, and the differential pressure through the boiler is increased by the adhered substances. Because of this, conventionally, various methods have been attempted for reducing the concentration of impurities within the feed water.

The impurities having fine particles of iron oxides as the main constituent and contained in the feed water to the SG or to the boiler can be mainly divided into two portions, a portion introduced from the condensate line and a portion introduced from various heater drain systems (a low pressure feed water heater drain, a moisture separator drain, a high pressure feed water heater drain and so forth). In the condensate line, a condensate treatment system is provided which comprises a condensate pre-filter and a condensate demineralizer or a condensate demineralizer alone, and therefore introduction of impurities from the condensate line is relatively small. Therefore, in order to reduce the concentration of impurities in the feed water to the SG and to the boiler, it would be effective to reduce particularly the amount of impurities introduced from various heater drain systems downstream of the condensate treatment system.

The forms of iron impurities which are the primary constituents of the impurities in heater drain water systems in power plants will now be described. In a heater drain water system, in order to prevent corrosion of the equipment, pipes, etc., deoxidizing treatment, and pH adjusting through an addition of ammonia or various amines such as ethanolamine are performed so that the concentration of dissolved oxygen in the water is maintained at a few ppb or less and the pH of the water is maintained at a value of approximately 9. The pH adjustment is made in order to inhibit elution of iron ions from pipes or the like, and therefore, the percentage of ionic iron in the heater drain water is low and most of the iron to be removed is in the form of fine particles of iron oxides. Even under such conditions of water quality, due to corrosion of equipment, pipes, etc., a thin film of triiron tetroxide ($Fe_3O_4$; more commonly referred to as "magnetite") is formed on the surfaces of the equipment, pipes, etc. This film is steadily chipped away by the generated steam, resulting in production of fine particles of iron oxides. This phenomenon is commonly referred to as "erosion". It can be presumed that because these phenomena of formation of thin film of triiron tetroxide and steady chipping away of the formed thin film by the steam continue, very fine particles of iron oxides that are finer than the iron oxide particles within the condensate are formed and contained within the heater drain water.

The fine particles of iron oxides in the heater drain water exist in a form of vary fine particles due to the erosion phenomenon described above, and it has been known that removal rate of these particles using a filter or the like having a commonly used filter rating (pore size) is not stable. Moreover, the use of an electromagnetic filter or a magnetic filter for removing the impurities having such fine particles of iron oxides as the main constituent from the heater drain water also results in similar unstable removal rates for impurities, and thus, has not been put into practice.

As a solution to this problem, Japanese Patent Laid-Open Publication No. Hei 11-57416 proposes a method wherein oxygen is mixed into the heater drain water of power plant before the heater drain water reaches the filter so that the fine particles of iron oxides can be converted into a form that can be easily captured by the filter. According to this method, by injecting oxygen into the heater drain water so that the concentration of dissolved oxygen in the heater drain water after the mixing treatment is in a range of 20 ppb–100 ppb (=$\mu$g/L (liter; also apply similarly to the following descriptions)), and more preferably, in a range from 40 $\mu$g/L–100 $\mu$g/L, it is possible to achieve a removal rate of 90% or greater for the impurities by the filter.

However, for the feed water to the SG or boiler, it is desired that the concentration of dissolved oxygen be maintained below 5 $\mu$g/L–7 $\mu$g/L in view of prevention of corrosion or the like, and, therefore, dissolving oxygen to a concentration exceeding this range is not desirable.

SUMMARY OF THE INVENTION

The present invention was conceived to solve the above described problem and an object of the present invention is to provide a method for treating heater drain water in a power plant which can stably remove fine particles of iron oxides contained in heater drain water in a power plant.

Through extensive studies of methods for removing iron constituents in heater drain water of power plant, the present inventors have found that by adjusting the amount of oxygen to be injected to a range which results in a very small concentration within a range from 1 ppb to 20 ppb of dissolved oxygen in the heater drain water after oxygen mixing, the impurity removal capability of the filter can be drastically improved and made the present invention based on the finding.

According to one aspect of the present invention, in a process of removing fine particles of iron oxides from heater drain water of power plant containing such fine particles of iron oxides through a solid-liquid separation operation using a filter, oxygen is mixed into the heater drain water of power plant before the heater drain water reaches the filter so that the concentration of dissolved oxygen in the heater drain water after the oxygen mixing is in a range from 1 $\mu$g/L to 20 $\mu$g/L, and more preferably, in a range from 1 $\mu$g/L to 5

µg/L. With such treatment, the fine particles of iron oxides can be transformed into a form that can be readily captured and removed using the filter.

DESCRIPTION OF PREFERRED EMBODIMENT

A preferred embodiment of the present invention will now be described referring to the drawings. The present invention, however, is not limited to the preferred embodiment described herein.

Figure 5:
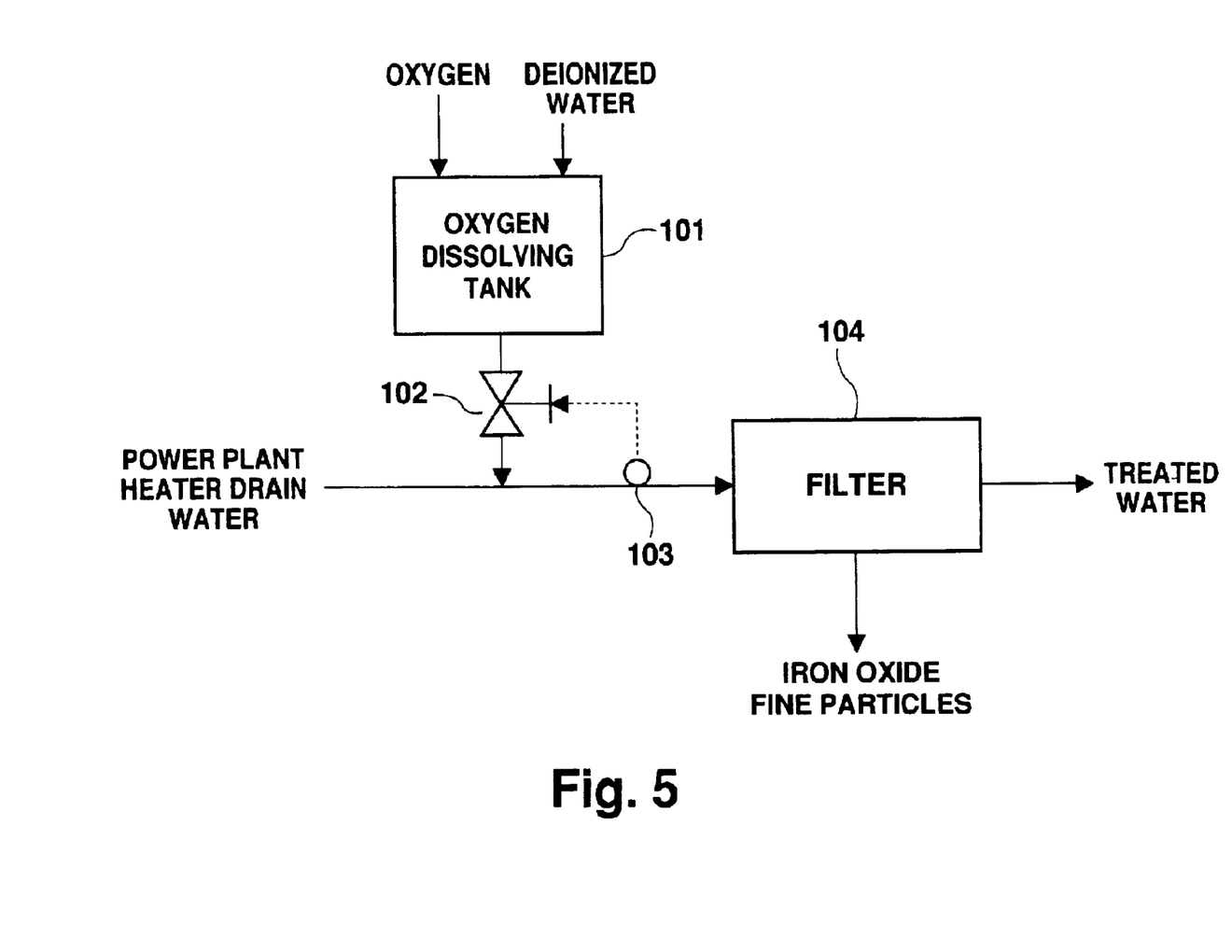
FIG. 5 is a block diagram showing a structure of a preferred embodiment of the present invention.

FIG. 5 shows a structure in a preferred embodiment of the present invention. Oxygen-dissolved water into which oxygen has been dissolved by an oxygen dissolving tank 101 is supplied and mixed into heater drain water of power plant containing fine particles of iron oxides (raw water) through a valve 102.

The oxygen dissolving tank 101 is separated internally into two chambers by a membrane (for example, a hollow fiber membrane). Oxygen gas is supplied with a predetermined pressure into one of the chambers and deionized water is supplied with a predetermined pressure into the other chamber to allow oxygen to dissolve into the deionized water.

The obtained oxygen-dissolved deionized water having a predetermined concentration of dissolved oxygen is mixed with the raw water through the valve 102. The concentration of dissolved oxygen after the mixing of oxygen-dissolved deionized water with the raw water is measured using a dissolved-oxygen meter 103 and the degree of opening of the valve 102 is adjusted so that the concentration of the dissolved oxygen is in a range of 1 µg/L–20 µg/L, and more preferably, in a range of 1 µg/L–5 µg/L.

The raw water with which oxygen is mixed is introduced to a filter 104 and fine particles of iron oxides contained in the raw water are removed. In particular, in this embodiment, by mixing a predetermined amount of oxygen into the raw water, the fine particles of iron oxides are transformed into a form that can be easily removed by the filter 104, thus allowing for desirable removal of the iron constituents. In addition to the above structure, oxygen may alternatively be directly dissolved with the raw water.

For example, the control standard for the concentration of dissolved oxygen in heater drain water of power plant in PWR is 5 µg/L, but actually, this concentration is very low within a range from 0.1 µg/L to 0.3 µg/L. On the other hand, the iron oxide constituents in heater drain water are primarily comprised of very fine magnetite particles of an order of sub-micron, and therefore, stable capture and removal of the iron oxide constituents cannot be achieved using a filter. As a result, the iron removal rate is low and unstable. By injecting oxygen into such heater drain water so that a small amount of oxygen is made in contact with the fine particles of iron oxides, the equilibrium state of the fine particles of iron oxides is disturbed through some mechanism and particles of iron oxides having a larger size are produced from the fine particles of iron oxides. The particles of iron oxides formed in this process can then be readily filtered and removed using a filter.

The amount of oxygen to be injected is adjusted so that the concentration of dissolved oxygen in the heater drain water after the oxygen mixing is in a range from 1 µg/L to 20 µg/L, and more preferably, in a range from 1 µg/L to 5 µg/L. In this manner, while maintaining sufficient impurity removal capability, the concentration of dissolved oxygen within the feed water can be adjusted within the control limits. Although there are some cases where the concentration of dissolved oxygen within the heater drain water is 1 µg/L or greater even before oxygen is mixed, by allowing contact of fine particles of iron oxides with the very small amount of injected fresh oxygen, the equilibrium state of the fine particles of iron oxide is disturbed and particles of iron oxides are produced which can then be filtered and removed using a filter.

In the method of the present invention, the process for mixing oxygen with the heater drain water of power plant is not limited to the method as shown in FIG. 5. For example, oxygen may be mixed by directly injecting clean oxygen gas or air into the heater drain water by blowing, or by mixing oxygen-containing water (preferably prepared by mixing oxygen with deionized water) into the heater drain water as an oxygen injection solution. The latter method is desirable because it allows for easier setting of the concentration of dissolved oxygen, etc. The oxygen-containing water is preferably prepared by injecting clean oxygen gas or air into water such as deionized water, but may alternatively be prepared more easily by placing water such as deionized water in a tank in an atmosphere of clean oxygen gas or air and stirring the water until desired oxygen concentration is obtained.

As a filter used for filtration in the method of the present invention, various filters may be utilized which uses a micronic filtration membrane or ultrafiltration membrane. Moreover, because the particle size is now larger, an electromagnetic filter, a superconductor electromagnetic filter, a magnetic filter, etc. may also be used to remove the iron oxide constituents.

If a filter such as a hollow fiber membrane filter is used for filtration, it is possible to apply a pre-coating treatment to the surface of the filter prior to applying the method of the present invention. More specifically, before passing heater drain water of power plant which is the water to be treated through the filter, water into which a pre-coating agent of fine particles of iron oxides such as $Fe_3O_4$ (magnetite) having a particle size of 1 µm to 10 µm are added may be passed through the filter to form, in advance, a pre-coating film of the fine particles over the surface of the filter (Japanese Patent Laid-Open Publication No. Hei 11-165006). Some of such fine particles of iron oxides for pre-coating purpose is commercially available, and thus, such pre-coating can be easily achieved.

As a filter, any of the above described filters can be employed. A typical filter that may be used includes various filters having different filtration element shapes such as a hollow fiber type filter, a plaiting type filter, and a disk type filter, and various organic and inorganic filters having different filtration element materials such as a macromolecule membrane filter, a ceramic filter, a metal filter, a sintered metal filter, and a carbon filter. In addition, as described above, an electromagnetic filter, a superconductor electromagnetic filter, a magnetic filter, etc. may also be used.

Figure 1:
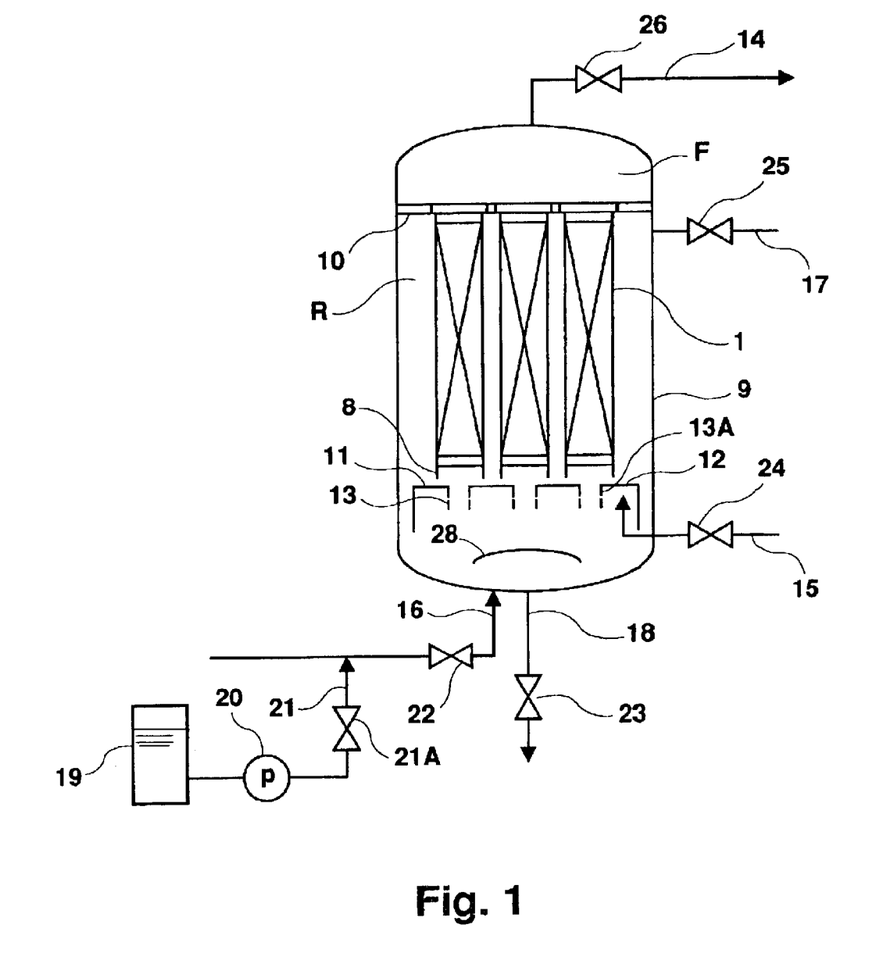
FIG. 1 is a structural diagram showing a structure of a filtration apparatus used in a preferred embodiment of the present invention.
Figure 2:
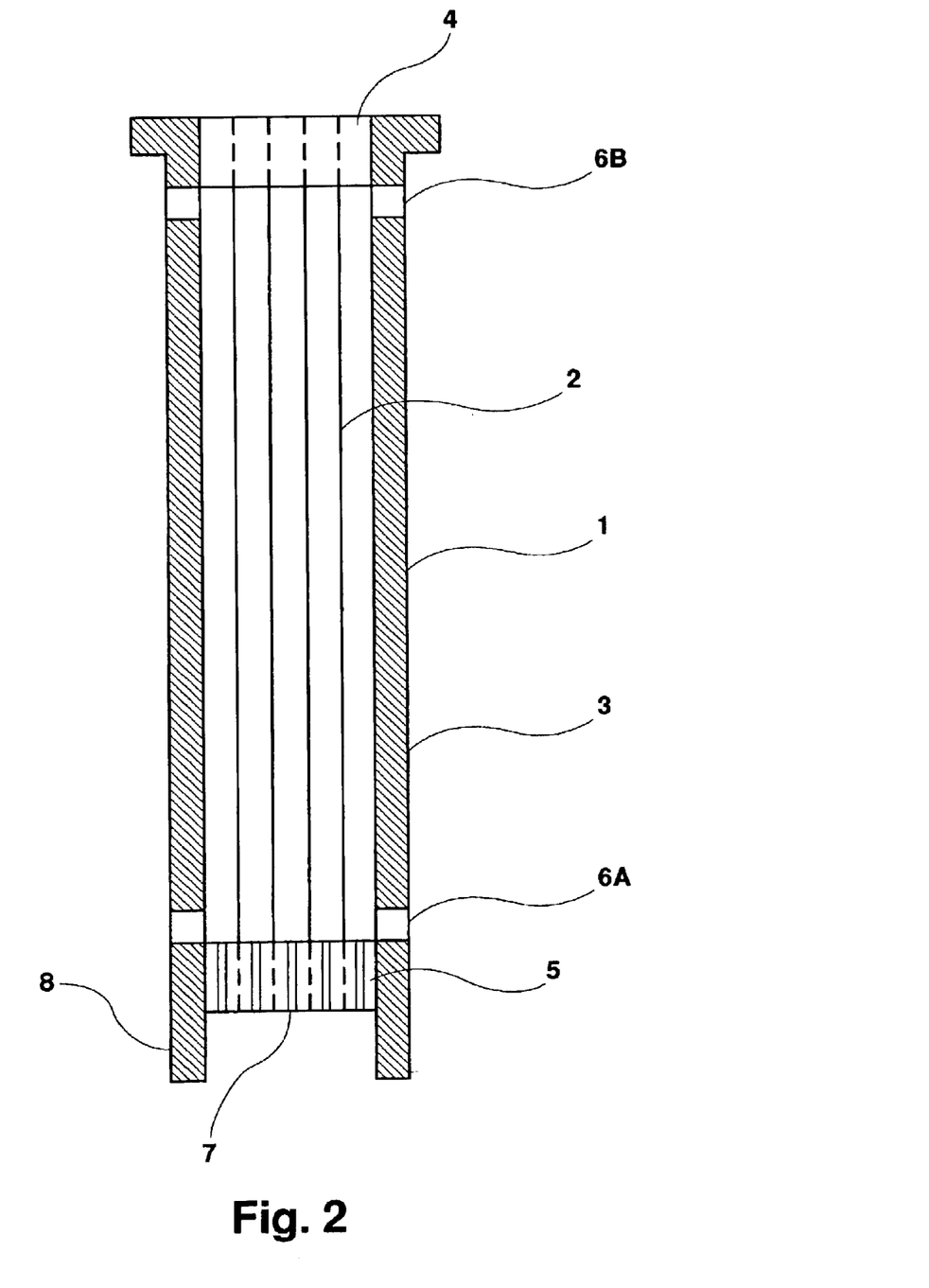
FIG. 2 is a cross sectional diagram showing a hollow fiber membrane module mounted in a filtration apparatus used in a preferred embodiment of the present invention.
Figure 3:
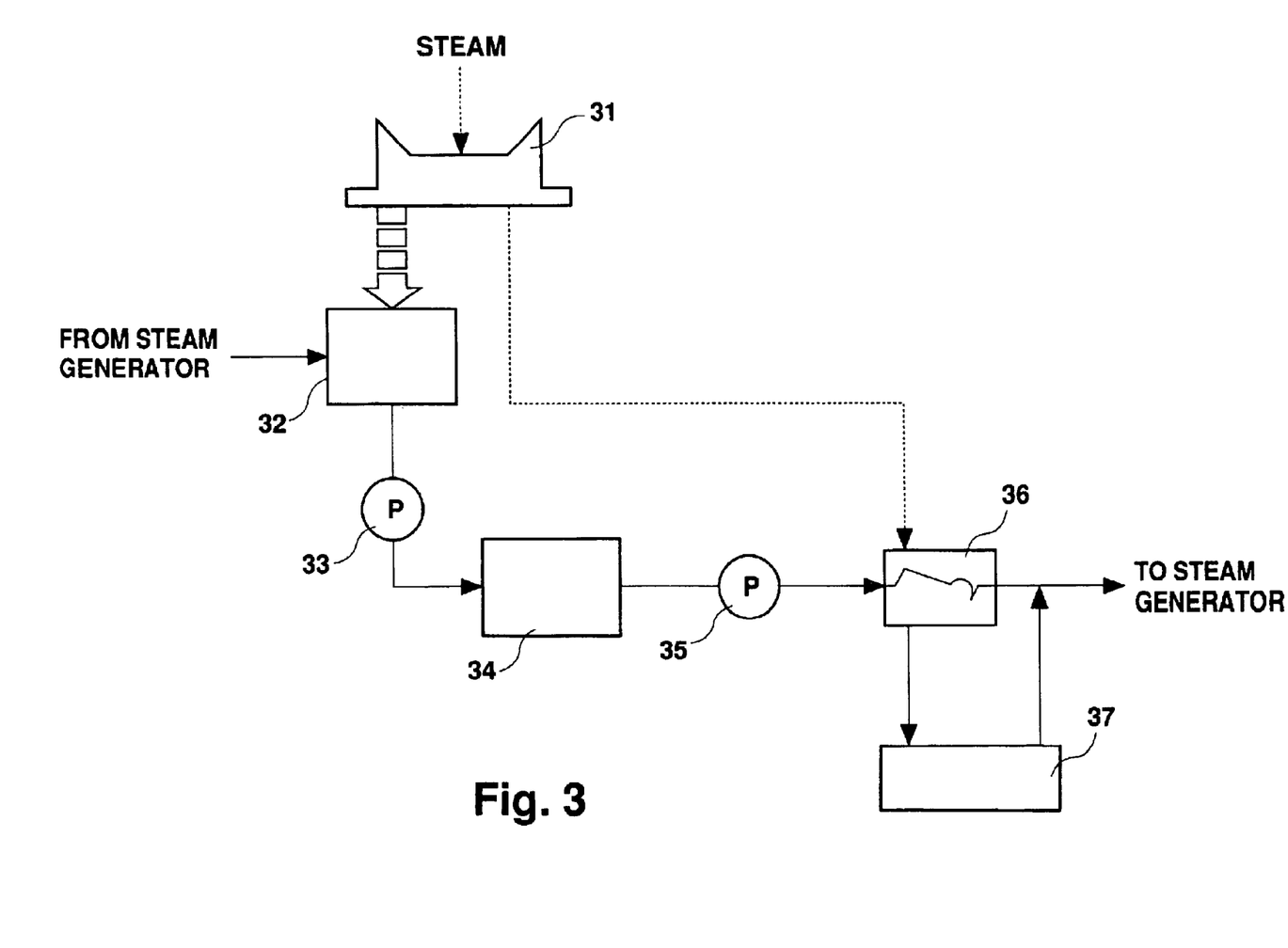
FIG. 3 is a flow diagram showing a peripheral system of a low pressure feed water heater in a power plant in which the filtration apparatus of FIG. 1 is employed.

FIG. 1 is a structural diagram showing a structure of a filtration apparatus used in the preferred embodiment of the present invention. FIG. 2 is a cross sectional diagram showing a hollow fiber membrane module mounted in a filtration apparatus used in the embodiment. FIG. 3 is a flow diagram showing a peripheral system of low pressure feed water heater in a power plant in which the filtration apparatus shown in FIG. 1 is used.

In the preferred embodiment described herein, an example structure is described in which a macromolecule hollow fiber membrane (hereinafter referred to simply as "hollow fiber membrane") filter is used.

As shown in FIG. 2, a hollow fiber membrane module 1 used in the preferred embodiment comprises approximately 100 to 50,000 hollow fiber membranes 2 (filter element) each having an outer diameter of 0.3 mm–5 mm and an inner diameter of 0.2 mm–4 mm and having very fine pores of a diameter of 0.01 $\mu$m–0.3 $\mu$m, the fiber elements being stored in a protection casing 3. The upper ends of the hollow fiber membranes 2 are potted in an upper junction section 4 without sealing the upper ends and the lower ends of the hollow fiber membranes 2 are sealed and potted in a lower junction section 5. Communication holes 6A and 6B are provided respectively in the lower and upper sections of the protection casing 3 and openings 7 are provided in the lower junction section 5. The protection casing 3 is slightly extended downwards so that a skirt section 8 is formed. This hollow fiber membrane module 1 has the lower ends of all hollow fiber membranes 2 closed and therefore is of a one-end water collecting type which collects water from the upper end. It is also possible to employ any of various two-end water collecting type hollow fiber membrane modules in which water is collected from both ends of the hollow fiber membrane.

In order to place such a hollow fiber membrane module 1 in a filtration column 9, as shown in FIG. 1, a division plate 10 is provided in the upper section of the filtration column 9 to divide the inside of the filtration column 9 into an upper chamber F and a lower chamber R. A plurality of the hollow fiber membrane modules 1 extending in the vertical direction of the division plate 10 are suspended from the division plate 10.

In addition, a bubble distribution mechanism 11 is provided within the filtration column 9. The bubble distribution mechanism 11 comprises a bubble receptor 12 and bubble distribution pipes 13 penetrating through the bubble receptor 12. The bubble distribution pipes 13 are provided immediately below the skirt sections 8 of the hollow fiber membrane modules 1.

One end of a filtered water exiting pipe 14 is connected to the upper section of the filtration column 9 and one end of a raw water entering pipe 16, one end of a compressed air entering pipe 15, and one end of a drain pipe 18 are connected to the lower section of the filtration column 9. One end of an air vent pipe 17 is connected to the side of the filtration column 9 immediately below the division plate 10.

In FIG. 1, reference numeral 19 represents a tank for oxygen-containing deionized water and reference numeral 20 represents an injection pump (P) for oxygen-containing deionized water. One end of an injection pipe 21 for oxygen-containing deionized water is connected to the raw water entering pipe 16. Reference numerals 21A and 22 through 26 each represents a valve and reference numeral 28 represents a baffle plate.

Treatment of an example treatment target (water to be treated) of low pressure feed water heater drain water (raw water in a filtration column) in power plant using the filtration apparatus as described above and according to the method of the present invention will now be described.

Referring to FIG. 3, a peripheral system of a low pressure feed water heater in a power plant in which such filtration apparatus is used will be briefly described. The system shown in FIG. 3 comprises a low pressure turbine 31 which is driven by steam sent from a steam generator (SG; not shown), a condenser 32 for condensing the steam from the low pressure turbine 31 into water, a condensate demineralizer 34 for applying demineralization treatment to the condensate transported from the condenser 32 by a pump 33, and a low pressure feed water heater 36 for heating the condensate to which the demineralization treatment has been applied and supplied from the condensate demineralizer 34 through a pump 35 using steam (steam is shown in FIG. 3 by a dotted line) supplied from the low pressure turbine 31. The condensed and treated water heated at the low pressure feed water heater 36 is sent to the steam generator through a high pressure feed water heater (not shown) or the like. As shown in FIG. 3, a filtration apparatus 37 with an oxygen injection equipment as described above is provided next to the low pressure feed water heater 36. The system is configured so that the heater drain water is filtered by the filtration apparatus 37 to remove, from the heater drain water, impurities having fine particles of iron oxides as the main constituent, and the obtained filtered water is combined with the condensed and treated water heated by the low pressure feed water heater 36.

Before passing heater drain water (hereinafter referred simply as "raw water") which is the water to be treated, the upper chamber F and the lower chamber R of the filtration column 9 is filled with deionized water. Then, in the filtration steps, valves 22 and 26 are first opened, and then, the injection pump 20 for oxygen-containing deionized water is activated and the injection valve 21A for oxygen-containing deionized water is opened so that the oxygen-containing deionized water is mixed with the raw water. The concentration of dissolved oxygen in the raw water within the lower chamber R of the filtration column 9 is adjusted to a range from 1 ppb ($\mu$g/L) to 20 ppb, and more preferably, to a range from 1 ppb to 5 ppb. The raw water to which oxygen-containing deionized water is mixed flows into the lower chamber R of the filtration column 9 through the raw water entering pipe 16, the fine particles of iron oxides in the raw water are filtered by the hollow fiber membrane modules 1, and the filtered water is collected in the upper chamber F and exits from the filtered water exiting pipe 14.

The differential pressure of the filtration column 9 is increased as the filtration treatment is continued. When the differential pressure reaches a predefined value, a scrubbing treatment is applied. In order to avoid roughening of the surface of the hollow fiber membrane 2 due to the scrubbing treatment as much as possible, prior to the scrubbing treatment, a measure can be taken to reduce the temperature of the raw water within the lower chamber R of the filtration column 9 (Japanese Patent Laid-Open Publication No. Hei 4-135632). Alternatively or in addition, a treatment can be applied in which fine particles which are dislodged in the initial stages of the scrubbing treatment are allowed to settle and then the scrubbing treatment is resumed or a preliminary blowdown can be carried out in which the wash waste water containing fine particles which have been dislodged in the initial stages of the scrubbing treatment is discarded from the lower chamber R (Japanese Patent Laid-Open Publication No. Hei 4-110023).

The scrubbing treatment for removing fine particles of iron oxides deposited on the surface of the hollow fiber membrane 2 is performed as follows. First, the valves 22 and 26 are closed. While the lower chamber R is continued to be filled with the raw water and the upper chamber F is continued to be filled with filtered water, the valves 24 and 25 are opened to allow compressed air to flow in from the compressed air entering pipe 15. The compressed air is received at a lower surface of the bubble receptor 12 and then flows into the skirt section 8 of the hollow fiber membrane module 1 as bubbles through an air communication hole 13A of the air distribution pipe 13. The bubbles of compressed air then enter into each of the hollow fiber membrane modules 1 through respective openings 7. As these bubbles moves upwards, each hollow fiber membrane 2 is caused to vibrate and the water within the hollow fiber membrane module 1 is stirred, resulting in detachment of fine particles of iron oxides which were contained in the raw water and then captured in the surface of each hollow fiber membrane 2. The detached fine particles spread into the lower chamber R of the filtration column 9. The bubbles flow out of the hollow fiber membrane module 1 through a communication hole 6B of the hollow fiber membrane module 1 and then is discharged out of the filtration column 9 through the air vent pipe 17.

The fine particles of iron oxide detached and spread into the water within the lower chamber R of the filtration column 9 through the scrubbing treatment as described above are blown out of the filtration column 9 upon completion of the scrubbing treatment. More specifically, while the valve 25 is continued to be opened, the valves 24 and 23 are opened so that the wash waste water to which the fine particles are spread is discharged out through the drain pipe 18. This blowdown treatment for discharging the wash waste water takes advantage of difference in pressure heads. It is also possible to employ blowdown treatment wherein compressed air is introduced from the air vent pipe 17 or compressed air entering pipe 15 to achieve a rapid discharge taking advantage of the air pressure. After the scrubbing treatment by stirring water using compressed air and the blowdown treatment of wash waste water as described above, water passing treatment comprising the steps of mixing oxygen-containing deionized water into the raw water and filtering as described above is resumed.

In the above embodiments, it is also possible to apply a pre-coating treatment for the surface of the hollow fiber membrane 2 as described earlier.

EXAMPLE

The present invention will now be described in more detail referring to an example. The example, however, is only for the purpose of exemplifying and is not intended to limit the scope of the present invention.

In this example, the following experiment was performed using a compact experimental filtration apparatus having a structure similar to the filtration apparatus shown in FIG. 1. First, deionized water filled into a tank was stirred in a clean oxygen atmosphere and an oxygen injection solution was prepared which had characteristics as described below.

Figure 4:
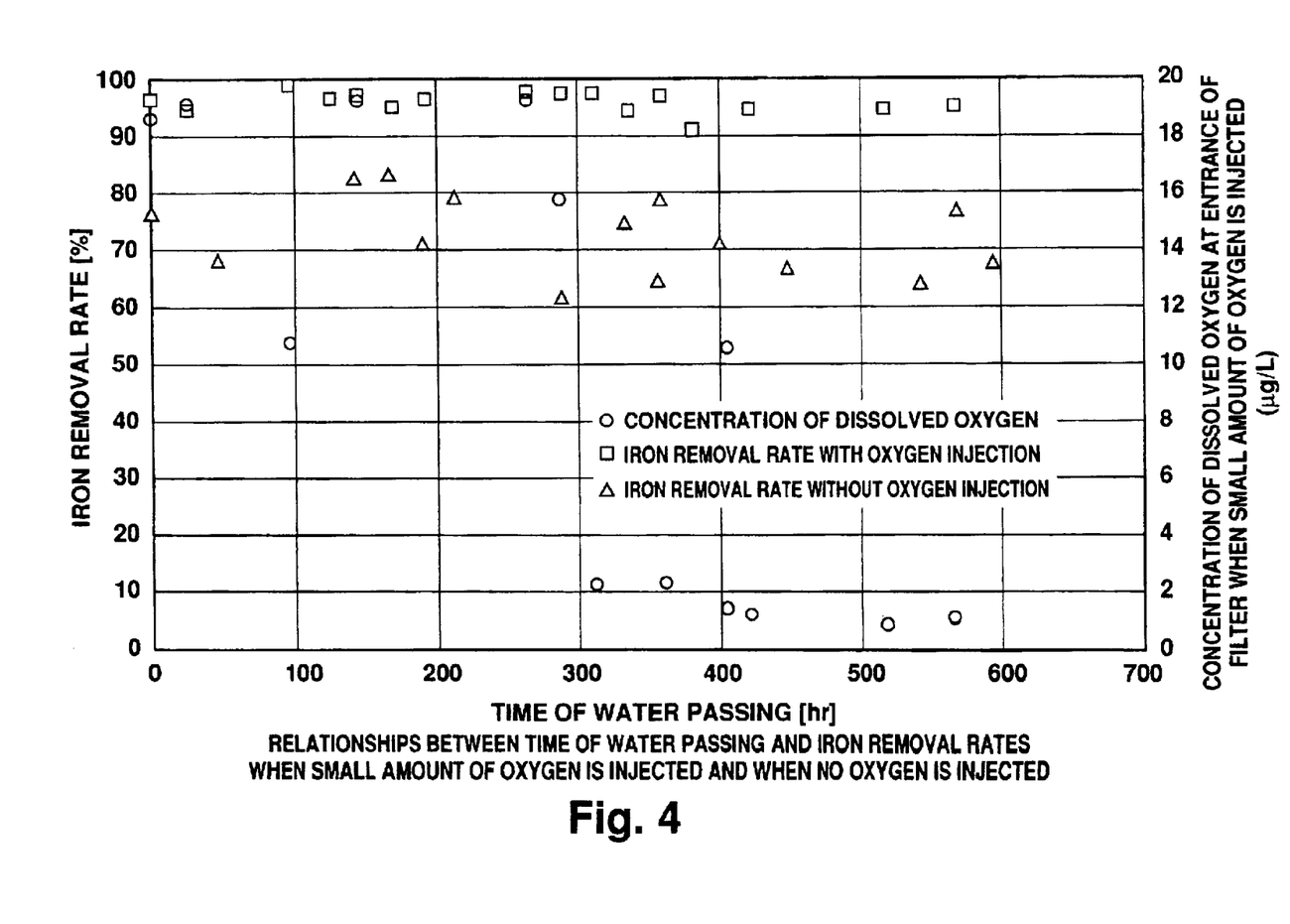
FIG. 4 is a graph showing results of experiments for tracking a change, as time elapses, of the iron removal rates for heater drain water using a hollow fiber membrane filtration column (filter) in a case wherein a small amount of oxygen is injected into the heater drain water (example) and in another case wherein no oxygen is injected into the heater drain water (comparative example).

Then, the oxygen injection solution was mixed into drain water of a low pressure feed water heater in a power plant (having water temperature of 80° C.–90° C. and concentration of dissolved oxygen of less than 1 $\mu$g/L in the experiment, although the control limit was less than 5 $\mu$g/L) such that the concentration of dissolved oxygen after the mixing is adjusted between 1 $\mu$g/L and 20 $\mu$g/L. The drain water was then passed through the filtration column (filter). A change of iron removal rate as time elapsed was tracked. The results are shown in FIG. 4. In FIG. 4, the circular markings (○) represent the concentration of dissolved oxygen at the entrance of the filter after the mixing of a small amount of oxygen and the square markings (□) represent the iron removal rate by the filter when the small amount of oxygen was mixed. The quantitative method used for calculating the iron removal rate was the TPTZ method (2,4,6-tri-2-pyridyl-1,3,5-triazine absorptiometry).

Specification of the experiment using compact experimental filtration apparatus

1. Hollow fiber membrane module
   Diameter of pores of hollow fiber membrane: approximately 0.1 $\mu$m
   Outer diameter of hollow fiber membrane: 1 mm
   Inner diameter of hollow fiber membrane: 0.7 mm
   Length of hollow fiber membrane: 300 mm
   Number of hollow fiber membranes: 400
2. Number of hollow fiber membrane modules: 1
3. Oxygen injection solution: deionized water having concentration of dissolved oxygen of 8 mg/L under room temperature
4. Filtration speed: 0.1 m/hr It can be seen from the results shown in FIG. 4 that, when iron constituents containing of fine particles of iron oxide are to be removed from high temperature water such as heater drain water, it is possible to maintain a high iron removal rate of approximately 90% or greater by merely injecting a small amount of oxygen into the heater drain water.

COMPARATIVE EXAMPLE

As a comparative example, an experiment was performed wherein low pressure feed water heater drain water was passed through the filtration column (filter) of the experimental filtration apparatus under conditions identical to those in the above example except that no oxygen injection solution was mixed into the heater drain water and the change in iron removal rate as time elapsed was tracked. The results are also shown in FIG. 4. In FIG. 4, the triangular markings (Δ) represent the iron removal rate when iron constituents were removed using the filter without mixing oxygen.

It can be seen from the results shown in FIG. 4 that the iron removal rate is approximately 70%, and the iron removal rate is unstable and fluctuates.

As described, according to the method for treating heater drain water of power plant of the present invention, it is possible to stably and reliably remove fine particles of iron oxides within heater drain water of power plant, and, as a consequence, introduction of the fine particles of iron oxides into the steam generator or into the boiler in a power plant can be effectively prevented. In addition, because the amount of oxygen to be injected is small, it is possible to minimize the adverse effects to the plant such as corrosion.

What is claimed is:

1. A method for removing fine particles of iron oxides within water, the method comprising the steps of mixing oxygen, by using a stream of water having least 1 $\mu$g/liter of oxygen dissolved therein, with heater drain water of a power plant which contains fine particles of iron oxides such that the concentration of dissolved oxygen within said heater drain water after the mixing of oxygen is maintained in a range from 1 $\mu$g/liter to less than 20 $\mu$g/liter; and filtering said heater drain water after said oxygen mixing through a filter to remove said fine particles of iron oxide.

2. A method according to claim 1, wherein in said oxygen mixing step, oxygen is mixed with said heater drain water such that the concentration of dissolved oxygen in said heater drain water after the mixing of oxygen is in a range from 1 $\mu$g/liter to 5 $\mu$g/liter.

3. A method according to claim 1, wherein oxygen is mixed with said heater drain water by mixing oxygen-containing water in which oxygen is dissolved with said heater drain water.

4. A method according to claim 1, wherein a hollow fiber filter is used as said filter.

5. A method according to claim 4, wherein one or more a pre-coat filter, a plaiting type filter, and a disk type filter is used as said filter.

6. A method according to claim 4, wherein one or more a micronic filtration membrane, a ultrafiltration membrane, an electromagnetic filter, a superconductor electromagnetic filter, a magnetic filter, a pre-coat filter, a plaiting type filter, and a disk type filter is used as said filter.

* * * * *